United States Patent [19]

Austin

[11] 4,272,487
[45] Jun. 9, 1981

[54] CARBON BLACK REACTOR WITH INNER AND OUTER HOT COMBUSTION GAS ENTRIES PROVIDING PROTECTIVE BLANKET AND EXTRA HOT GASES FOR CONVERSION OF FEED

[75] Inventor: Oliver K. Austin, Bartlesville, Okla.

[73] Assignee: Phillips Petroleum Company, Bartlesville, Okla.

[21] Appl. No.: 99,390

[22] Filed: Dec. 3, 1979

Related U.S. Application Data

[62] Division of Ser. No. 957,608, Nov. 3, 1978, Pat. No. 4,220,624, which is a division of Ser. No. 701,007, Jun. 28, 1978, Pat. No. 4,134,966.

[51] Int. Cl.³ .............................................. C09C 1/50
[52] U.S. Cl. .................................... 422/150; 422/156
[58] Field of Search ...................... 422/150, 151, 156; 423/450, 455, 456, 457, 458

[56] References Cited

U.S. PATENT DOCUMENTS

| | | | |
|---|---|---|---|
| 2,656,254 | 10/1953 | Heller | 422/158 X |
| 2,924,512 | 2/1960 | Webster et al. | 422/151 |
| 3,076,695 | 2/1963 | Claassen, Jr. et al. | 423/455 |
| 3,256,065 | 6/1966 | Latham, Jr. | 422/150 |
| 3,333,928 | 8/1967 | Kobayashi | 423/456 |
| 3,431,075 | 3/1969 | Gunnell . | |
| 3,619,138 | 11/1971 | Gunnell | 423/456 X |
| 3,681,031 | 8/1972 | Johnson | 422/150 X |
| 3,701,827 | 10/1972 | Dahmen | 423/456 |
| 3,728,437 | 4/1973 | Vanderveen | 422/150 X |
| 3,986,836 | 10/1976 | Cheng | 423/450 |
| 3,989,804 | 11/1976 | Vanderveen | 422/156 |

FOREIGN PATENT DOCUMENTS 675819 7/1952 United Kingdom ..................... 422/150

*Primary Examiner*—Frank W. Lutter
*Assistant Examiner*—Roger F. Phillips

[57] ABSTRACT

In the usual elongated carbon black furnace which is provided at one end with a combustion gas entry section, usually of diameter larger than the remainder of the reactor, in lieu of the usual entry port or ports providing hot combustion gases with which to decompose the make oil or gas to carbon black, there are provided independent, double-entry port or pipes. At each double entry there is an outer port and an inner port or pipe. Usually, the pipe approaches the enlarged section or precombustion chamber somewhat tangentially and at a substantial right angle to the longitudinal axis of the elongated reactor or furnace. Thus, viewing the furnace end-on, the outer port or entry will spew its fluid near and onto the walls of the precombustion chamber while the inner port or entry will deliver its gases to a point nearer the longitudinal axis. By feeding so as to obtain a blanket of relatively cool gas adjacent the walls of the precombustion chamber by means of the outer port and a relatively much hotter gas through the inner port, the walls of the chamber are protected while at the same time the make oil or gas can be subjected immediately to a great deal more heat and higher temperature such that higher yields of carbon black are obtained. A novel furnace precombustion zone structure is disclosed.

6 Claims, 5 Drawing Figures

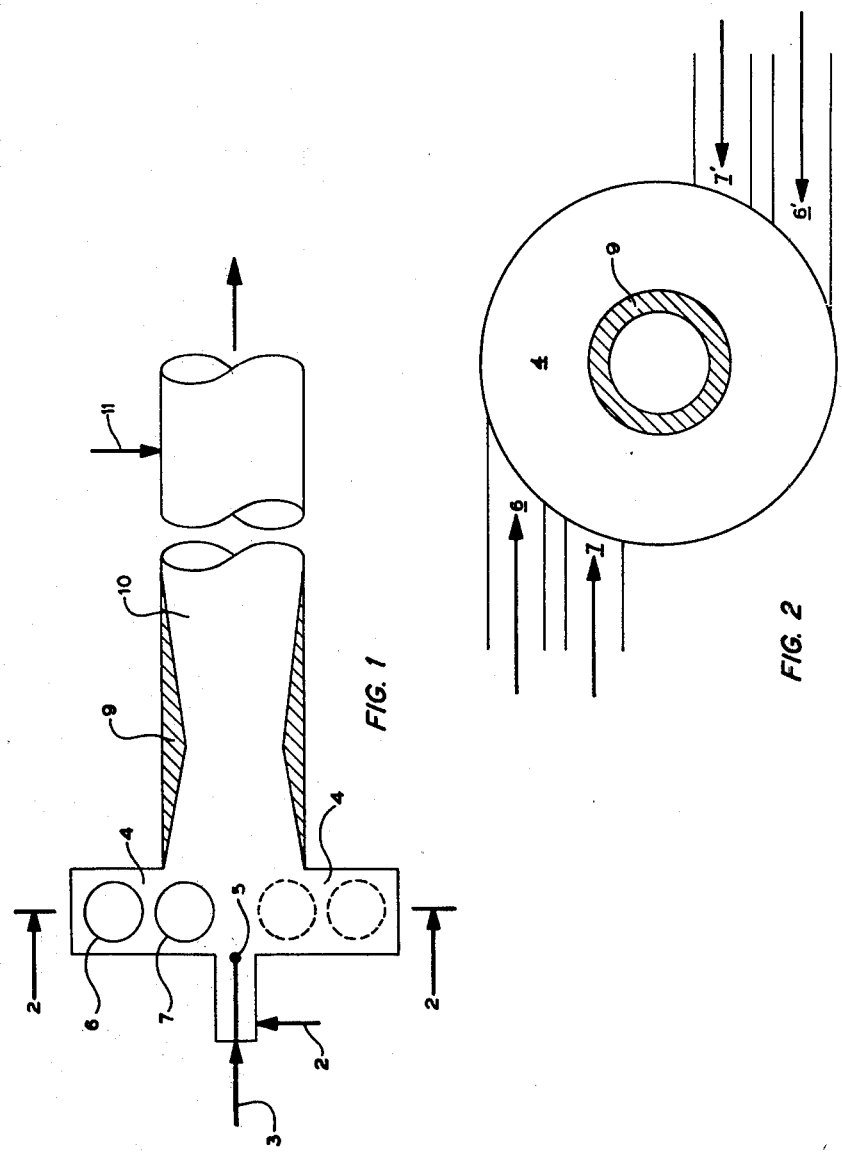

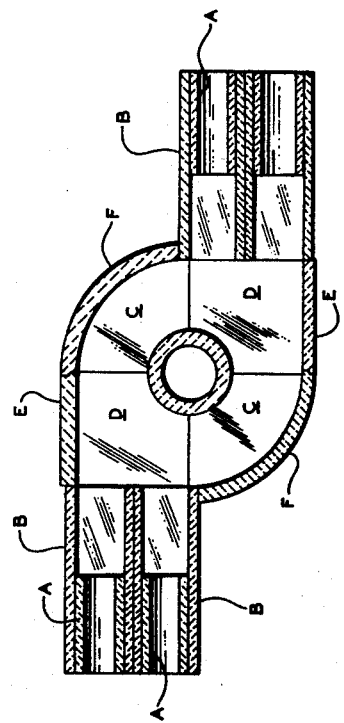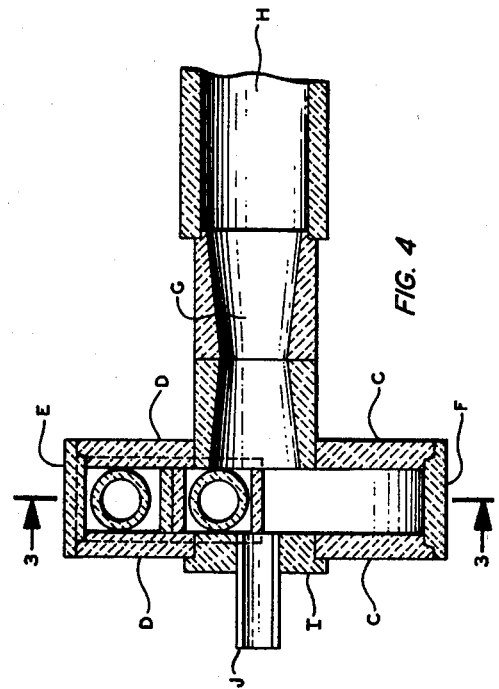

CARBON BLACK REACTOR WITH INNER AND OUTER HOT COMBUSTION GAS ENTRIES PROVIDING PROTECTIVE BLANKET AND EXTRA HOT GASES FOR CONVERSION OF FEED

This is a division of our co-pending application Ser. No. 957,608, filed Nov. 3, 1978, now U.S. Pat. No. 4,220,624, which is a division of Ser. No. 701,007, filed June 28, 1978, now U.S. Pat. No. 4,134,966, issued Jan. 16, 1979.

This invention relates to the production of carbon black. In one of its aspects, it relates to a novel carbon black-producing furnace. In another aspect of the invention, it relates to an apparatus for producing increased yields of carbon black from a carbon black furnace oil or gas feed.

In one of its concepts, the invention provides in an elongated carbon black production furnace at one end thereof a precombustion section having means through which there are dually-fed two separate independent streams of combustion gases or combustion gas-producing materials, having different temperatures and/or composition, said means including peripheral or outer and non-peripheral or inner ports, pipes, or inlets, thus to produce a blanket of relatively cool gas adjacent the walls of the precombustion section or reactor while at the same time permitting, by means of such an insulation blanket of hot gases, the introduction or production in situ of relatively much hotter combustion gases having an air-fuel ratio such that the make oil or gas from which carbon black is to be produced is subjected instantly to extremely high temperature and readily available heat content such that increased yields of carbon black from the make oil or gas are produced while the furnace structure is protected.

In another concept, the invention provides a precombustion section structure.

The production of furnace carbon black is well known. Many patents, trade journal articles, and treatises describe the basic process.

U.S. Pat. No. 3,431,075, T. J. Gunnell, issued Mar. 4, 1969, describes and claims an advantageous modification of the basic process wherein a plurality of streams of hot combustion gases resulting from the combustion of like combustible mixtures of a hydrocarbon fuel and an oxidant are introduced into a generally cylindrical first zone having a diameter greater than its length, a hydrocarbon feedstock is introduced along the longitudinal axis of said first zone, said feedstock surrounded by a moving blanket of hot combustion gases passes into an axially aligned generally cylindrical second zone having a length greater than its diameter, and carbon black product is recovered from the gaseous effluent from said second zone, the improvement comprising producing at least one of said streams of hot combustion gases by burning a combustible mixture of a hydrocarbon fuel and an oxidant containing an amount of oxidant which is less than the stoichiometric amount required for the burning of said fuel and producing at least one other of said streams of hot combustion gases by burning a combustible mixture of a hydrocarbon fuel and an oxidant containing an amount of oxidant which is greater than the stoichiometric amount required for the burning of said fuel.

U.S. Pat. No. 3,431,075, the disclosure of which is incorporated herein by reference, shows introduction of make oil through pipe 15 into section 13. There is also introduced into section 13 by way of conduits 17 and 17' a mixture of air and fuel. The conduits are described in the patent as tangential inlet tunnels. Also introduced into section 13 through 18 and 18', radially is an air-fuel mixture. The air-fuel ratios introduced on the one hand at 17 and 17', tangentially, and on the other hand, radially, at 18 and 18' are advantageously different.

The patent describes that the yield of carbon black can be increased by operating in a manner to supply to section 13, which is referred to as a "first zone," at least one stream of hot combustion gases obtained by burning a combustible mixture of a hydrocarbon fuel and an oxidant which contains less than the stoichiometric amount of oxidant required for the burning of said fuel, and supplying to said first zone at least one other stream of hot combustion gases obtained by burning a combustible mixture of a hydrocarbon fuel and an oxidant containing an amount of oxidant which is greater than the stoichiometric amount required for the burning of said fuel. According to the patent, such operation results in the creation of a new burning and heat release zone located within said first zone downstream from the points of introduction of hot combustion gases and adjacent the axial path of the hydrocarbon feedstock through said first zone. The new burning and heat release zone is created when the hot combustion gases containing the excess fuel contact the hot combustion gases containing excess oxidant, resulting in the combustion of the excess fuel.

Viewed in the light of the patent, just discussed, the apparatus of the present invention does not admix a tangentially introduced stream with a radially introduced stream but, rather, introduces, by its dual introduction means, streams which are essentially parallel as introduced. One of these streams, introduced by the outer port, tends to flow adjacent the wall of the precombustion zone or section while the other stream tends to be blanketed from the wall by said first introduced, now peripheral stream.

Thus, while the air-fuel ratios of the dually introduced streams of the present invention can be and preferably are different, the air-fuel ratio of the inner stream is so chosen as to produce immediately in contact with the make oil or gas the optimum carbon black-forming temperature and amount of heat. This is accomplished while protecting the walls of the precombustion zone, which include high maintenance pieces, e.g., an upper overhang necessary to form the connection between the tangential tunnel and the precombustion chamber of the usual furnace.

An object of this invention is to produce carbon black. Another object of the invention is to provide a novel carbon black-producing reactor structure. A still further object of the invention is to so structure a carbon black-producing reactor that the reactor wall is protected while at the same time the optimum temperature and amount of heat in carbon black-producing combustion gases impinge upon the make oil or gas directly without substantial admixture with any other air-fuel mass.

Other aspects, concepts, objects, and the several advantages of the invention are apparent from a study of this disclosure, the drawing, and the appended claims.

According to the present invention, there is provided an elongated carbon black production furnace in which there is located at one end an axial hydrocarbon oil or gas feed for feeding hydrocarbon to be converted to carbon black, and at the other end means for removing gases and carbon black produced therein, disposed at said one end of said elongated passageway, a usually larger, hot combustion gas section in axial alignment with the longitudinal axis of said passageway, said section usually having a cross-sectional area larger than the major portion of said passageway, and means for supplying hot combustion gases in said section; the improvement which comprises at least two combustion gas feeds disposed one inside the other with respect to the longitudinal axis of said passageway and means upon each of said combustion gas feeds for supplying combustion gas from each of said feeds into said section independently one from the other in a manner such that different rates of flow of combustion gases of different temperatures and/or composition can be simultaneously effected through said feeds into said section, thereby to produce a blanket of combustion gases to travel adjacent the periphery of wall portion of said section and a relatively hotter, inner layer of combustion gases encompassed within said blanket, whereby the oil to be converted to carbon black can be subjected to hotter-than-usual combustion gases while maintaining for a substantial length of travel the blanket around said inner hotter-than-usual combustion gases along the longitudinal axis of said passageway, thus to yield more carbon black from the oil than otherwise obtainable, without injury to said combustion gas section.

Referring now to the drawing,

FIG. 1 is a vertical, cross-sectional view taken along the axis of a carbon black reactor according to the invention.

FIG. 2 is a vertical cross section taken at right angles to the longitudinal axis of the reactor along line 2—2.

FIG. 3 is a cross-sectional view of the precombustion chamber of the carbon black reactor apparatus which was used in the invention, the view being taken along line 3—3 of FIG. 4. FIG. 3 illustrates the assembly of these simple-shaped, easily assembled, preformed ceramic pieces used to construct this apparatus.

FIG. 4 is a cross-sectional view of the apparatus of the invention taken through the longitudinal axis of this carbon black reactor.

Figure 5:
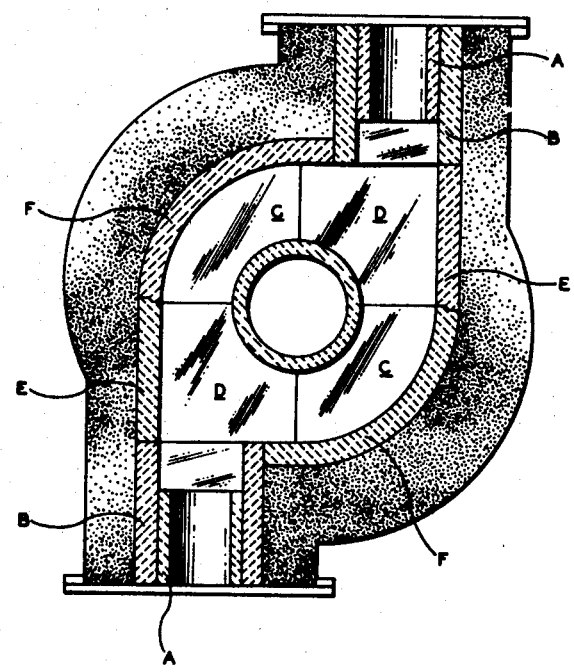
FIG. 5 is a cross-sectional view through the precombustion zone of a conventional O-type carbon black reactor, showing the assembly of the simple-shaped, easily assembled, preformed ceramic pieces which can be used to construct this conventional O-type carbon black reactor.

Referring now to the figures, make oil is introduced at 3 and ejected into the precombustion or hot zone 4 through nozzle 5. The oil-introducing pipe is cooled in usual manner by introducing axial air at 2.

According to the invention, there are provided air-fuel combustion gas-producing and injection pipes, ports, or inlets 6 and 7 which, in the modification described, are in juxtaposition and essentially parallel each to the other, and corresponding inlets or ports 6' and 7' which, in the modification described, are again parallel each to the other and in a direction parallel to ports 6 and 7. Although the invention is operable with but one set of dual, introducing ports, e.g., 6 and 7, it is now preferred to have at least two oppositely positioned sets even as illustrated by 6 and 7 on the one hand and 6' and 7' on the other. It can be seen that in precombustion zone or section 4 there will be produced an outer layer of combustion gases traveling peripherally along the walls of section 4 and an inner mass of hot gases which are blanketed from the walls, at least for a time. The introduced oil is contacted immediately and intimately with the hot combustion gases introduced at 7 and 7'. According to the invention, these gases are in an amount and at a temperature and air-fuel ratio such as to deliver optimum carbon black producing heat to the make oil or gas.

While ports 6 and 7 on the one hand and 6' and 7' on the other are shown in FIG. 1 to lie largely in a vertical plane at right angles to the longitudinal axis of the reactor, it is within the scope of the invention to have these ports differently arranged. The important point to note is that the ports are to be so arranged with respect to temperatures of their respective gases and their amounts and heat contents or heat delivering capacities that the oil will be instantly admixed and subjected to the influence of a hot gas which is optimum for maximum yield, without concern for the protection of the combustion chamber because it is blanketed with the relatively cooler and safer hot combustion gases coming in at 6 and 6'.

The remainder of the reactor can be conventional and in the embodiment described the totality of the gases and any incompletely converted make oil or gases are passed through a venturi 9 located in the elongated portion 10 of the reactor. Quench 11 is applied to the mass of gases now containing the product carbon black which then are sent to usual carbon black recovery here not described for sake of simplicity.

FIGS. 3 and 4 show prefabricated ceramic pieces A, B, C, D, E, and F used to construct the precombustion chamber of the carbon black reactor used in obtaining the data for runs 1 through 6 herein.

Ceramic A is a cylinder piece affixed within the upstream end of tangential entry B. Tangential entry B is essentially square in cross section and elongated. Air and fuel, or hot combustion gases enter the precombustion zone via tangential entries comprising ceramic pieces A and B. Only four elements A and four elements B are required.

Ceramics C and D make up the upstream and downstream faces of the precombustion zone. A total of four elements C and four elements D are used in this embodiment. Each of the four elements C is quarter-circle shaped, as illustrated, with one corner cut out to form a smaller quarter-circle empty section. Each of the four elements D is essentially square-shaped with one corner cut out to form a small quarter-circle empty section.

To enclose the precombustion chamber having upstream and downstream faces comprising elements C (two each) and D (two each) in each face, preformed ceramic pieces E and F are used. There are used two elements E and two elements F as illustrated. Each element E is essentially rectangularly shaped, and each element F is curved so as to fit the curvature of elements C, as illustrated.

Conventional refractory mortar is used in assembling the apparatus pieces. Each face is made of two elements each of C and D and the two faces are enclosed by two elements each of E and F (see FIGS. 3 and 4). Tangential entries B abut the precombustion chamber at elements D, as shown.

The quarter-circle empty sections of elements C and D are sized to fit around the ceramic cylinder adapter I have ceramic means J therein, in the upstream face through which axial air is passed and the make oil conduit is inserted, and also around the reactor element G which extends, in FIG. 4, to compose with the two elements C and two elements D the downstream face of the precombustion chamber. As seen in FIG. 4, the reactor section inlet is made of two sections G and H in the form of a venturi. Additional cylindrical ceramics are used downstream. The venturi is optional. That is, cylindrical shaped ceramics can be used throughout the reaction section.

The various elements B, C, D, E, F, G, and H are recessed on adjacent lips to form a lap joint where the refractory mortar can be used. This lap joint is illustrated in the figures. This feature is not essential, but preferred. That is, the pieces could abut edge to edge with planar edges being adjointed.

FIG. 5 uses shapes A, B, C, D, E, and F in a conventional O-type reactor having a single tangential entry B to the precombustion chamber; that is, only one tangential entry and no stacked tangential entry is used in this embodiment of the invention and as illustrated in FIGS. 3 and 4. The prefabricated shapes of the invention used in FIG. 4, in the conventional O-type carbon black reactor are assembled as illustrated and in the manner above-described for FIGS. 3 and 4.

I. Typical Make Oil Materials

The preferred oil used is an aromatic concentrate oil such as that produced from solvent extraction of cracked light and heavy cycle oil produced from catalytic cracking of virgin gas oils and/or residual oils such as topped crude oils. A particularly satisfactory oil is referred to as "$SO_2$ extract" oil recovered from "liquid-liquid" $SO_2$ solvent extraction of these cracked "cycle" oils. An "$SO_2$ extract" oil was used in the operation of the invention. It had a Bureau of Mines Correlation Index (BMCI) of 100 and a boiling range of 500° F. to 800° F.

The invention is not limited to the use of such aromatic concentrates as feed oil. Other oils such as kerosene, gasoline boiling range hydrocarbons, heavy or light naphthas, or oils heavier than recycle oils can be used. Even natural gas can be used, as well as propane, butanes, pentanes, and the like. Hydrocarbons from other sources than petroleum can be used; for example, low temperature coal gas, coal tar distillates, shale distillates, coal heavy residues, and the like.

The oil can be added as a vapor or as a liquid, or a mixture. Steam, air, gaseous fuel, and the like can be used to assist in atomizing liquid feed. Bifluid nozzles can be used.

The oil injection locus, e.g., nozzle position, can be withdrawn upstream from the upstream face of the precombustion chamber (PCC), can be at the upstream face of the PCC, or even can be within the PCC, and further even within the converging section of a venturi reactor when a venturi is used.

Normally, cooling air or nozzle coke-prevention air is introduced annularly around the make oil pipe.

Essentially, according to the invention, the double different temperature layers of combustion gas are arranged to hit the hydrocarbon or make feed oil or gas with a very much hotter-than-usual combustion gas thus to very quickly, if not instantly, break it into very fine particles or portions of hydrocarbon being converted to desirable carbon black with a minimum of undesirable side reactions which do not lead to desirable blacks.

II. Tangential Hot Combustion Gases

Any fuel can be burned with air or oxygen-enriched air to form the hot combustion gases. These hot combustion gases can be formed in the tangential tunnels upstream of the precombustion chamber or even at the entrance to that chamber.

A natural gas (substantially methane) with a heating value of about 1000 Btu per standard cubic foot was used as fuel in the operation of the invention.

When using methane as fuel, one "stoichiometric" ratio of air to fuel is 10, as shown:

$$\frac{1}{CH_4} + \frac{10 \text{ (air)}}{2O_2 + 8N_2} \longrightarrow CO_2 + 2H_2O + 8N_2$$

This equation is the stoichiometric relationship of air and methane to yield $CO_2$ and $H_2O$ as the combustion products from burning $CH_4$. This is "100% stoichiometric".

If the air/fuel ratio is 15/1 (e.g., volumes), then the reaction is "150% stoichiometric" or 50% excess air.

High stoichiometric combustion, e.g., "150% stoichiometric," produces "cooler" combustion gases than, say, e.g., "100% stoichiometric" combustion, since at "150% stoichiometric" the 50% excess air must also be heated, resulting less rise in temperature as compared with combustion with less or no excess air.

In the reactor used according to the invention, there is an enlarged cylindrical precombustion chamber (PCC) into which oil was axially charged at the upstream end and the reaction section was in open communication with the downstream end of the PCC. Hot combustion gases were charged tangentially to the periphery of the PCC section. Usually, two tangential, double inlets would be used, being at 180° or on a "diameter" of the PCC. One double entry can be used; and more than two double, tangential entries for hot combustion gases can be used, preferably evenly separated around the cylindrically shaped precombustion zone.

In the operation of the invention, two (180° apart) tangential entry zones were used. These were stacked, so to speak, i.e., there were two tangential entry means at each one of the tangential entry zones or sections.

The outer tangential entry (using the reactor axis as the center) was set at a distance of larger "radius" than the inner tangential entry. Hot combustion gases of different quantities and qualities were fed by the outer and inner tangential entries. The outer tangential combustion gas was "more air-rich" than the inner tangential combustion gas. This allowed the "relatively" cooler hot combustion gases in the outer entry to contact the refractory of the PCC without danger of overheating the refractory. This outer tangential flow formed a vortex flow in the PCC. The inner tangential combustion gases were "less air-rich" and, of course, were at a higher temperature and, in a sense, were surrounded by the outer vortex (the inner gases did not substantially "touch" the refractory). The make oil entered the inner hot combustion gases vortex and immediately was thoroughly contacted by the relatively hot gases.

A greater quantity of combustion gases was charged into the outer tangential entry than into the inner tangential entry.

III. Typical Invention Run and Base Run

The base or "Conventional" run was made in a reactor as described by the following table and was made with a same venturi-type reactor as the "Invention" run except that the precombustion zone had only one (larger) tangential entry—using two such "one-pipe" entries 180° apart in the same size PCC. The "Invention" run had the double-pipe entries, each pipe of which was somewhat smaller as shown in the table.

In the following table are shown data for making N330 (HAF) type furnace carbon black. N330 is the current ASTM designation for HAF (High Abrasion Furnace) carbon black (the former Philblack ® 0 designation). Typical particle size is millimicrons for N330 is 26 to 30, as is known in the art.

The data in the tabulation are comparative data. Substantially, the same air rates, fuel gas (methane) rates, and oil rates are shown. More pounds of carbon black per gallon of charge oil were made by the invention, as shown in the last line of the table.

| IV. Reactor Dimensions: | Conventional | Invention |
|---|---|---|
| Precombustion Zone: | | |
| Length, inches | 12 | 8 |
| Diameter, inches | 39 | 37 |
| Tangential Entry Diameter: | | |
| $^a$Single conduit, inches | 11 13/16 | — |
| $^a$Outer entry conduit, inches | — | 7¾ |
| $^a$Inner entry conduit, inches | — | 7¾ |
| Total inlet area/unit, in.$^2$ | 110 | 94 |
| Axial air annulus diameter, inches | 3 | 3 |
| Venturi Section: | | |
| Length, inches | 27 15/16 | 27 15/16 |
| Inlet Diameter, inches | 15 | 15 |
| Outer Diameter, inches | 15 | 15 |
| $^b$Throat Diameter, inches | 8 | 8 |
| Reactor Section: | | |
| Diameter, inches | 15 | 15 |
| Length (to Quench locus) | (to make about | |
| | 80 photelometer) | |

$^a$Note that entry velocities will be different in all runs.
$^b$The throat is halfway between inlet and outlet of venturi section.

While in the runs according to the invention the outer and inner inlets for hot combustion gas presence were in substantial alignment in a plane at right angle to the axis of the elongated furnace, it is within the scope of the claims to arrange the double-piped inlets differently so long as there are obtained the outer protective blanket and the inner, contained hotter gas mass. Thus, so long as the outer, relatively cooler gas blankets the walls of the precombustion chamber the actual pipes or inlets need not be uniform, nor need they be in perfect alignment. Thus, the outer inlet port can be somewhat ahead, or behind, i.e., upstream or downstream, of the inner inlet port or pipe, or vice versa. Variations of positioning of each inlet, even when there are a plurality of inner and a plurality of outer inlets can be had. The nozzle 5 was at the upstream face of the precombustion zone in all four runs.

PLANT RUN DATA
N330 Black

| OPERATION | Control | Invention Runs | | |
|---|---|---|---|---|
| Run Number | 1 | 2 | 3 | 4 |
| Total Air, SCF/hr. | 206,672 | 205,779 | 205,343 | 204,407 |
| Outer Tang., SCF/hr. | 198,773 | 120,962 | 120,336 | 120,240 |
| Inner Tang., SCF/hr. | 0 | 80,642 | 80,995 | 80,160 |
| Axial Air, SCF/hr. | 7,899 | 4,175 | 4,011 | 4,007 |
| Tangential Fuel (Natural Gas), SCF/hr. | 13,623 | 14,124 | 14,158 | 14,124 |
| Outer Fuel, SCF/hr. | 13,623 | 7,982 | 8,034 | 7,982 |
| Inner Fuel, SCF/hr. | 0 | 6,142 | 6,124 | 6,124 |
| Tangential Air/Tangential Gas Volume Ratio | | | | |
| Outer Ratio | 14.6 | 15.1 | 15.0 | 15.1 |
| Inner Ratio | — | 13.1 | 13.2 | 13.1 |
| Total Air/Gas Volume Ratio | 15.2 | 14.6 | 14.5 | 14.5 |
| Air Preheat, °F. | 797 | 785 | 798 | 800 |
| Axial Oil Rate, GPH | 330 | 325 | 330 | 330 |
| Total Air/Oil, SCF/gallon | 626 | 633 | 622 | 619 |
| Carbon Black Product | | | | |
| (1) Photelometer Value | 85 | 84 | 82 | 78 |
| (2) I$_2$No., m$^2$/gm | 88 | 96.5 | 96.1 | 95.1 |
| (3) N$_2$SA, m$^2$/gm | 96 | 101.2 | 97.1 | 94.5 |
| (4) CTAB, m$^2$/gm | 98 | 101.4 | 98.3 | 96 |
| (5) 24M4, DBP, cc/100 gm | 102 | 100 | 100.5 | 100.4 |
| (6) Tint Value | 110 | 115 | 113 | 115 |
| Yield, #CB/gal. oil | 3.98 | 4.15 | 4.20 | 4.4 |

Test Methods Used
(1) ASTM-D-1618-58T
(2) ASTM-D-1510-70
(3) ASTM-D-3037-71T, Method A
(4) J. Janzen and G. Kraus, Rubber Chemical and Technology, 44. 1287 (1971)
(5) U.S. Pat. No. 3,548,454, as measured after crushing, by Method B, ASTM-D-2414-70
(6) ASTM-D-3265-75

As noted earlier, the oil used was an SO$_2$ extract oil, Bureau of Mines Correlation Index (BMCI) of 100, boiling range 500° F. to 800° F. The oil was kept constant in all runs shown in the table.

Observations from Data

It is noted that base run (1) and the three invention runs (2), (3), and (4) were at approximately the same total air to oil ratios (at 626, 633, 622, and 619, respectively). The yield of the base run (1) was relatively low at only 3.98 pounds of carbon black per gallon of make oil, while the invention runs (2), (3), and (4) were higher at, respectively, 4.15, 4.20, and 4.40 pounds of carbon black per gallon of make oil.

The tint values were slightly higher in the invention runs, as desired.

The nitrogen surface areas and CTAB values (particle size) were substantially the same (it is noted run 2 has slightly higher values than the other runs), and the 24M4 values were substantially the same in all runs. This indicates the same quality or type of carbon black was made in all four runs, as desired for comparison of yields.

Air to natural gas (about 1,000 Btu/SCF) stoichiometric ratio is 10 to 1. A 15 to 1 ratio means 50 percent excess air or 150 percent of stoichiometric amount. Natural gas is substantially methane. (If fuel were propane, stoichiometric ratio is 25/1 for air to propane.)

While the dimensions and specific design of the reactor which has been described, according to the invention, are now preferred, it will be understood by one skilled in the art in possession of this disclosure having studied the same that considerable variation in structure, design, and relative sizes or configurations can be accomplished so long as there is at least one dual-entry or equivalent means to produce within the precombustion zone or section the condition of a protective blanket which shields the apparatus against the optimum hot gases which independently from concern for the apparatus can be so supplied in quantity and quality such that the desired type and optimum yield of carbon black for that type can be produced.

It is within the scope of the invention to vary the point at which the nozzle emits the make oil or gas into the precombustion chamber. As it is known in the art, by varying by precise point of contact of the hot gases with the make oil or gas differing results can be obtained. For each type of feed and air-fuel ratios, there can be different structural configurations leading to optimum results.

Because the outer tunnel or feed port is operated at an air/fuel ratio greater than stoichiometric and the inner tunnel is operated at less than stoichiometric air/fuel ratio, both using preheated air, the axial oil feed nozzle which can be protected can be inserted into the precombustion zone to a locus nearer the venturi entry to produce higher tint black.

Reasonable variation and modification are possible within the scope of the foregoing disclosure, the drawing, and the appended claims to the invention the essence of which is that there have been provided in a precombustion zone section of a carbon black furnace-type reactor at least one dual-inlet or port through which, independently, there can be supplied hot gases which are relatively cool and which blanket the apparatus against damage by considerably hotter gases and a hotter gas within said blanket to immediately and instantly operate upon make oil or gas to convert the same to carbon black at a temperature and with heat sufficient such that improved quality and/or yield of carbon black can be obtained.

I claim:

1. In an elongated carbon black production furnace in which there is located at one end of an elongated passageway an axial hydrocarbon oil or gas feed for feeding hydrocarbon to be converted to carbon black and at the other end means for removing gases and carbon black produced therein, disposed at said one end of said elongated passageway, a hot combustion gas section in axial alignment with the longitudinal axis of said passageway, and means for supplying said hot combustion gases in said section; the improvement which comprises at least two individual tangential entry combustion gas feeds consisting essentially of an outer tangential entry gas feed, and an inner tangential entry gas feed disposed inside said outer tangential entry gas feed with respect to the longitudinal axis of said passageway, said inner gas feed being spaced from the periphery or wall portion of said section, and means upon each of said combustion gas feeds for supplying tangentially into said passageway combustion gas from each of said feeds into said section independently one from the other in manner such that different rates of flow of combustion gases of different temperatures and/or composition can be simultaneously effected through said feeds into said section, thereby to produce a blanket of combustion gases to travel adjacent the periphery or wall portion of said section and a relatively hotter, inner layer of combustion gases encompassed within said blanket, whereby the oil to be converted to carbon black can be subjected to optimum and/or hotter-than-usual combustion gases while maintaining for a substantial length of travel the blanket around said inner hotter or optimum combustion gases along the longitudinal axis of said passageway, thus to yield more carbon black from the oil than otherwise obtainable, without injury to said combustion gas section.

2. A carbon black production furnace according to claim 1 wherein said hot combustion gas section has a cross sectional area larger than the major portion of said passageway.

3. A carbon black furnace according to claim 1 wherein the gas feeds are parallel to each other and are disposed at a right angle with respect to said longitudinal axis.

4. An apparatus according to claim 3 wherein the inner gas feed is disposed adjacent and substantially parallel to said outer gas feed.

5. An apparatus according to claim 4 wherein there are at least two sets of said outer and inner gas feeds.

6. An apparatus according to claim 1 wherein there are at least two sets of said outer and inner gas feeds.

* * * * *